(12) United States Patent
Beach

(10) Patent No.: US 7,040,683 B1
(45) Date of Patent: May 9, 2006

(54) TRUCK BED EXTENDER

(76) Inventor: Jason Beach, 521 10th Ave. North East, Lonsdale, MN (US) 55046

( * ) Notice: Subject to any disclaimer, the term of this patent is extended or adjusted under 35 U.S.C. 154(b) by 0 days.

(21) Appl. No.: 11/054,994

(22) Filed: Feb. 10, 2005

(51) Int. Cl.
*B62D 25/00* (2006.01)

(52) U.S. Cl. ................................................. 296/57.1

(58) Field of Classification Search .............. 296/57.1, 296/61, 26.08
See application file for complete search history.

(56) References Cited

U.S. PATENT DOCUMENTS

| | | | |
|---|---|---|---|
| 4,472,639 A | 9/1984 | Bianchi | |
| 5,788,311 A | 8/1998 | Tibbals | |
| 5,816,638 A | 10/1998 | Pool, III | |
| 5,902,000 A | 5/1999 | Wold | |
| D417,859 S | 12/1999 | Leitner | |
| 6,019,410 A | 2/2000 | Trostle | |
| 6,227,593 B1 * | 5/2001 | De Valcourt | 296/26.08 |
| 6,257,637 B1 * | 7/2001 | Reed | 296/26.08 |
| 6,322,125 B1 * | 11/2001 | Bauer | 296/57.1 |
| 6,402,215 B1 * | 6/2002 | Leitner et al. | 296/57.1 |
| 6,422,627 B1 * | 7/2002 | Kuhn et al. | 296/57.1 |
| 6,435,588 B1 * | 8/2002 | Bauer | 296/57.1 |
| 6,540,123 B1 * | 4/2003 | Kmita et al. | 296/26.08 |
| 6,805,392 B1 * | 10/2004 | Leitner et al. | 296/26.08 |
| 6,948,755 B1 * | 9/2005 | Bauer | 296/61 |

OTHER PUBLICATIONS www.jcwhitney.com; Bed X-Tender.

* cited by examiner

*Primary Examiner*—Lori L. Coletta
(74) *Attorney, Agent, or Firm*—Lawrence J. Gibney, Jr.

(57) ABSTRACT

This is a device, which would extend a truck bed for a pickup truck without making any permanent modifications to the truck.

5 Claims, 5 Drawing Sheets

TRUCK BED EXTENDER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

Every pickup truck has a bed, which is normally used to haul different items. Although some of the beds are closed, most are open. This device allows the length of the bed to be extended. This would increase the storage capacity of the bed and also be useful in situations where extremely long items i.e. timbers or pieces of drywall need to be hauled.

B. Prior Art

In the prior art there are other examples of extensions to bed liners and a few examples of these are Leitner, D417, 859, Devalcourt U.S. Pat. No. 6,227,593, Tibbals, U.S. Pat. No. 5,788,311, and Trostle U.S. Pat. No. 6,019,410.

All of these devices extend the length of the truck bed in a variety of different fashions. In this case this device will allow one edge of the truck bed extender to fold down to load an item and then fold back up to again contain the contents of the pickup truck bed.

BRIEF SUMMARY OF THE INVENTION

Every pickup truck has a bed with a folding gate or tailgate. The purpose of the folding gate on the pickup truck is to insure that the contents in the bed of the truck remain in the bed when the items are hauled. This device extends that gate.

The device lies flat against the pickup bed surface and is comprised of a hard surface material, and a folding gate on one end. A hinge on the gate of this device allows the gate to rotate approximately one hundred eighty degrees from a vertical position relative to the pickup truck tailgate in an "up" position to a "down" position. When it is installed, the pickup truck bed is open and this device lies against the surface of the pickup truck bed and the tailgate.

The device is secured to the truck bed by two holding straps, which attach to the top surface of the folding gate device and a holding strap across the underside of the tailgate of the pickup. Hooks are provided to secure the holding strap. Steel bands or thick rope material may also be used for the holding straps.

The folding gate portion of this device will be solid in construction similar to the tailgate of the pickup truck. This solid structure will prevent debris from leaving the pickup truck bed and onto traffic in the road. Because of the exposure to the elements and the general nature of the material to be hauled, it should be constructed from durable material.

When the device is used it will be able to be strapped and unstrapped from the top surface of the truck bed liner as needed in the event that an extension is not necessary.

It is an object of the device to extend the useful length of a pickup truck bed without making any permanent modifications to the pickup truck and yet at the same time maintain the safety of the item for other traffic. It is a further object to make the device such that it can be easily removed, folded up and stored when not needed.

BRIEF SUMMARY OF THE INVENTION

Every pickup truck has a bed with a folding gate or tailgate. The purpose of the folding gate on the pickup truck is to insure that the contents in the bed of the truck remain in the bed when the items are hauled. This device extends that gate.

The device lies flat against the pickup bed surface and is comprised of a hard surface material, and a folding gate on one end. A hinge on the gate of this device allows the gate to rotate approximately one hundred eighty degrees from a vertical position relative to the pickup truck tailgate in an "up" position to a "down" position. When it is installed, the pickup truck bed is open and this device lies against the surface of the pickup truck bed and the tailgate.

The device is secured to the truck bed by two holding straps, which attach to the top surface of the folding gate device and a holding strap across the underside of the tailgate of the pickup. Hooks or other means are provided to secure the holding strap to the top surface of the device tailgate to the walls of the pickup truck. Steel bands or thick rope material may also be used for the holding straps.

The folding gate portion of this device will be solid in construction similar to the tailgate of the pickup truck. This solid structure will prevent debris from leaving the pickup truck bed and onto traffic in the road. Because of the exposure to the elements and the general nature of the material to be hauled, it should be constructed from durable material.

When the device is used it will be able to be strapped and unstrapped from the top surface of the truck bed liner as needed in the event that an extension is not necessary.

It is an object of the device to extend the useful length of a pickup truck bed without making any permanent modifications to the pickup truck and yet at the same time maintain road safety when using this device. It is a further object to make the device such that it can be easily removed, folded up and stored when not needed.

DETAILED DESCRIPTION OF THE EMBODIMENTS

Figure 1:
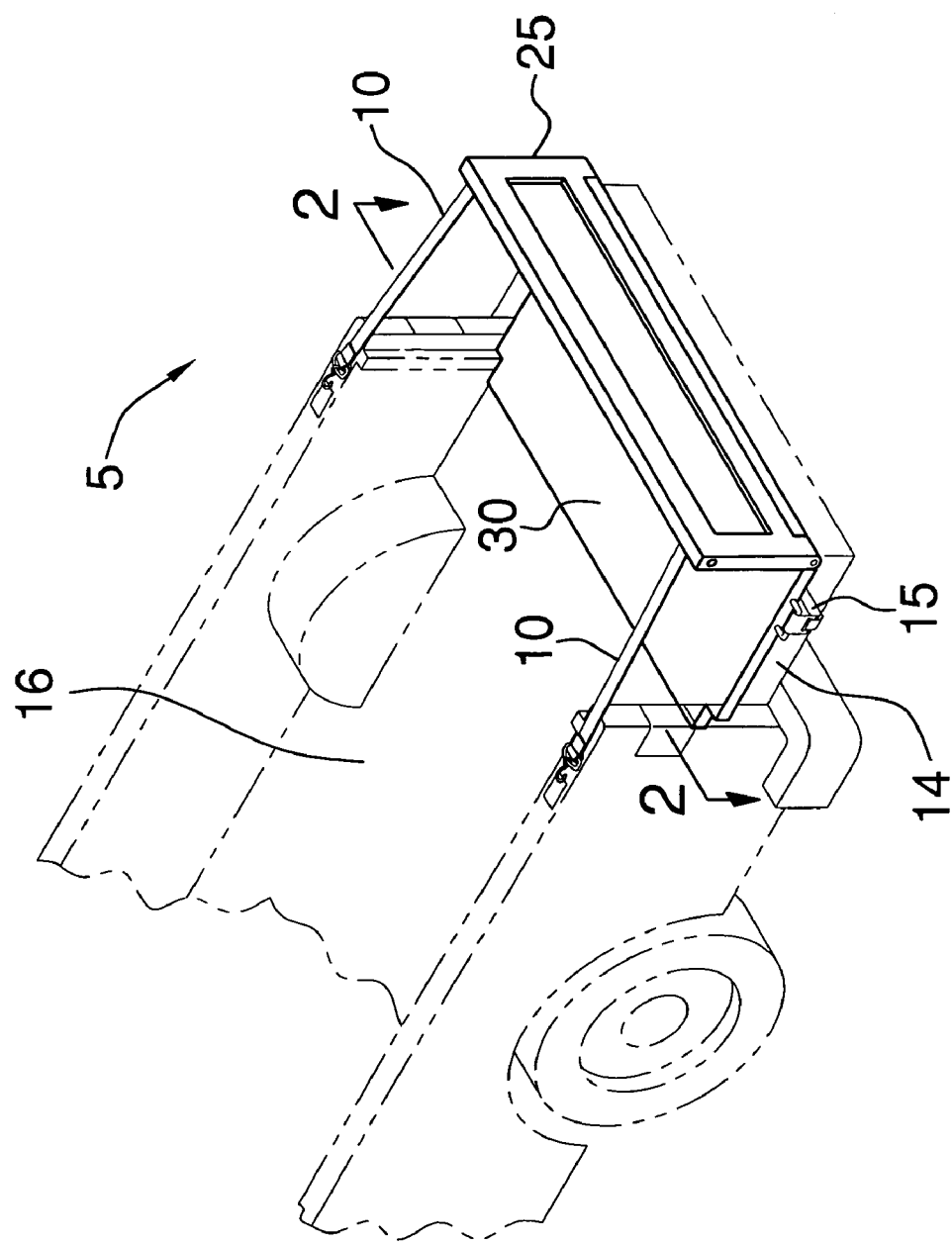
FIG. 1 is a perspective view of the device attached to a truck bed with the truck tailgate in a horizontal position.

This is a tailgate bed extension 5 and is used when the truck tailgate 14 is opened and is in a roughly horizontal position such as shown in FIG. 1. It is comprised of a flat surface 30, which rests on a portion of the bed of the pickup truck 16 and extends over the entire surface of the truck tailgate 14. A portion of the device will remain in the area of the original bed 16 of the truck. FIG. 1

Figure 2:
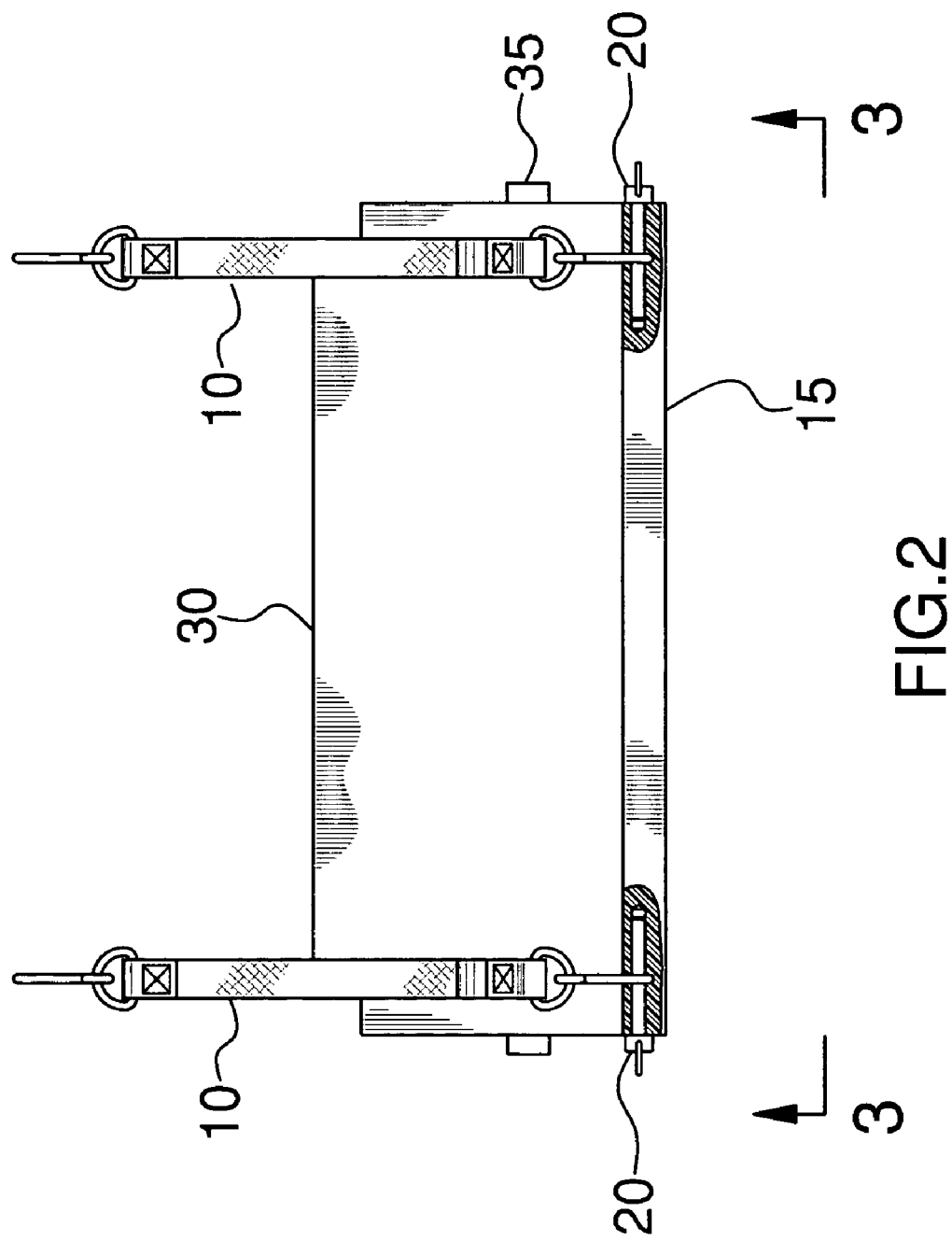
FIG. 2 is a top view of the device.
Figure 5:
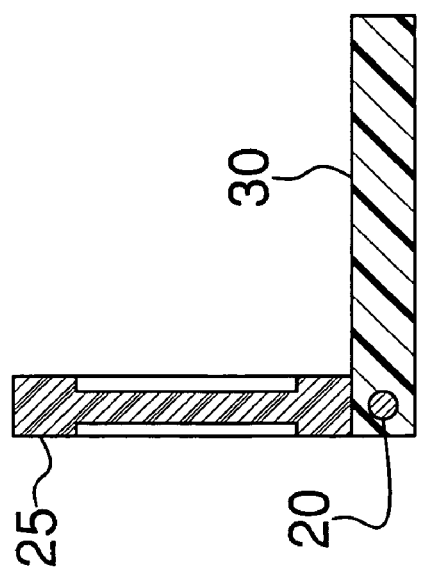
FIG. 5 is a cross sectional view of the device according to line 5—5 on FIG. 3.
Figure 4:
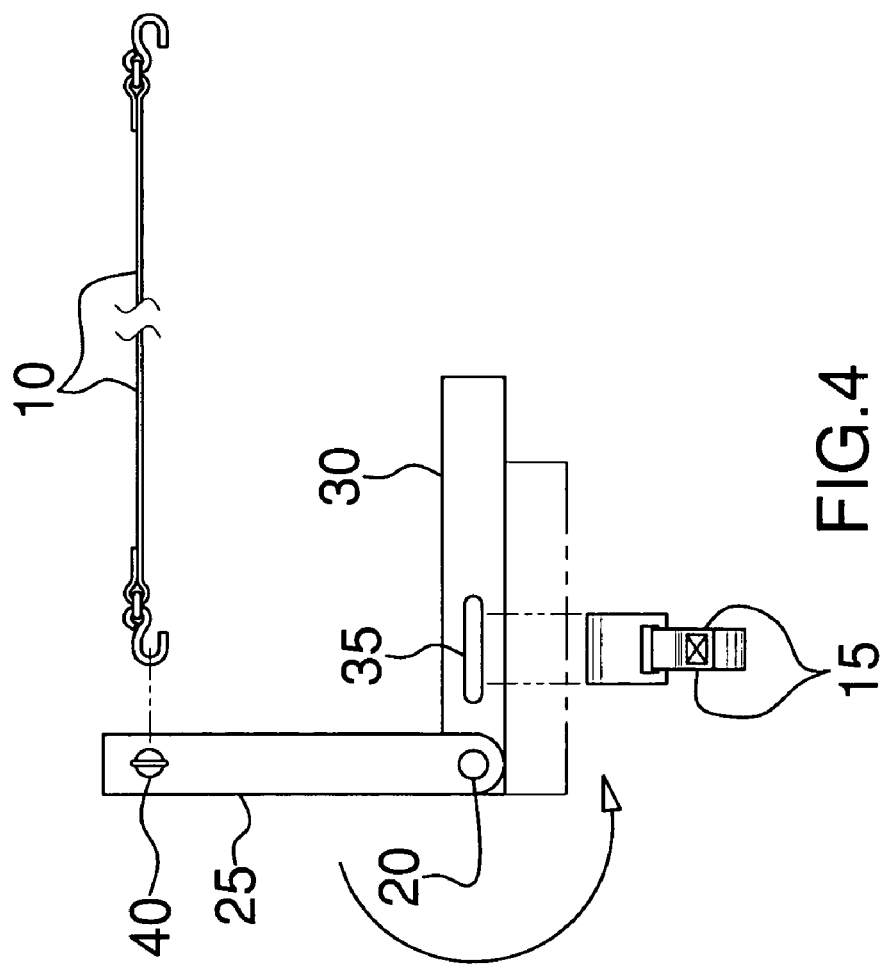
FIG. 4 is a side view of the device.

On one end of the device 5 is the device tailgate 25. When the device 5 is installed, the device tailgate 25 will be roughly perpendicular to one end of the device 5 and will be connected to the flat surface 30 at that end by a hinge 20. FIG. 5 Holding straps 10 will secure the top edge of the device tailgate 25 to the sides of the pickup truck. FIG. 2 A separate tailgate strap 15 will secure the device to the truck tailgate. FIGS. 1,4

The hinge 20 will enable the device tailgate 25 to rotate approximately one hundred and eighty degrees from a configuration of pointing straight up to a configuration where it is pointing straight down. The hinge 20 will allow the device tailgate 25 to rotate downward in order to load large items and then easily secure the device 5 when the items have been placed in the bed 16 of the pickup truck. FIGS. 4,5 The device tailgate 25 of this device will be constructed as a solid piece so that the items in the bed 16 of the pickup truck remain in the bed 16 of the truck.

Two holding straps 10 secure the device in place. The holding straps connect to one end of the device tailgate 25 and the other end to the sides of the pickup truck. Most trucks have holes in the sides of the truck and it is anticipated that the means of connection would include a pin or hook, which would fit within these predrilled holes. FIGS. 1,2,4 The holding straps 10 may be constructed of plastic, rope, nylon, or any other suitable material.

Figure 3:
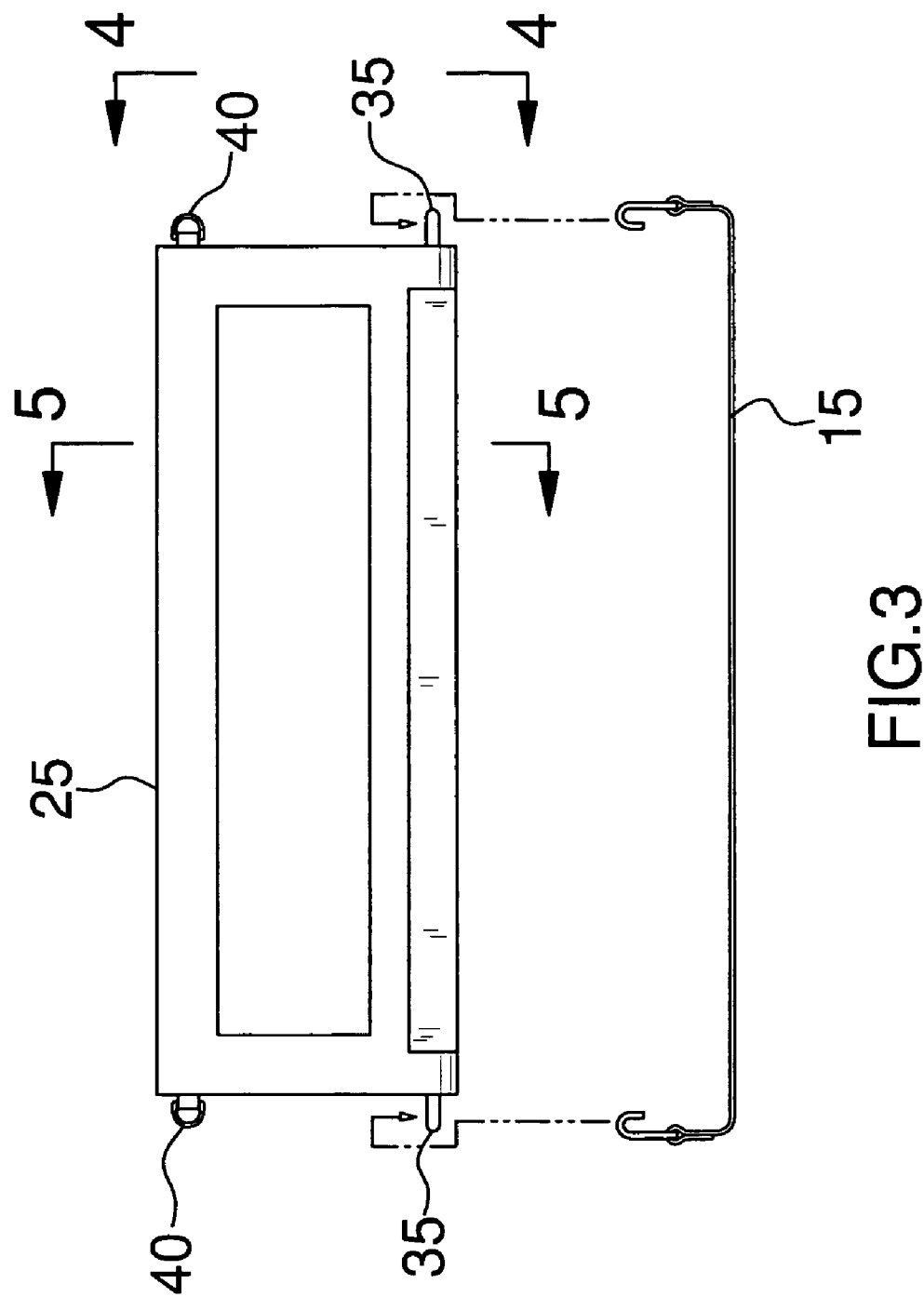
FIG. 3 is a partially exploded view of the tailgate and holding points for the straps.

The bottom surface 30 of this device will rest on the original tailgate 14 of the pickup truck. FIG. 1 It is imperative that the bottom surface not be allowed to shift especially if one or both of the holding straps 10 became damaged. As an added precaution the bottom surface 30 of this device is secured to the truck tailgate 14 by a separate tailgate strap 15. FIGS. 1,4 On the edges of the bottom surface 30 are the means to connect 35 the respective ends of the tailgate strap 15. FIGS. 1,3,4 It is anticipated that an elastic cord would be used for the tailgate strap 15 although other means such as ropes or steel bands may also be used. The means to connect 35 is depicted as hooks, which will accommodate hooks on the separate tailgate strap 15; other means may also be used.

On the sides of this device is a hook 35 which secures the tailgate strap 15. The purpose of this means to connect and separate tailgate strap 15 is to ensure that the device remains affixed as much as possible to the truck tailgate 14 during normal operations.

The device tailgate 25 can be hollow or solid although it is depicted as a solid piece. It is preferable that it be a solid piece for the safety of other vehicles on the road.

Second Embodiment

Figure 6:
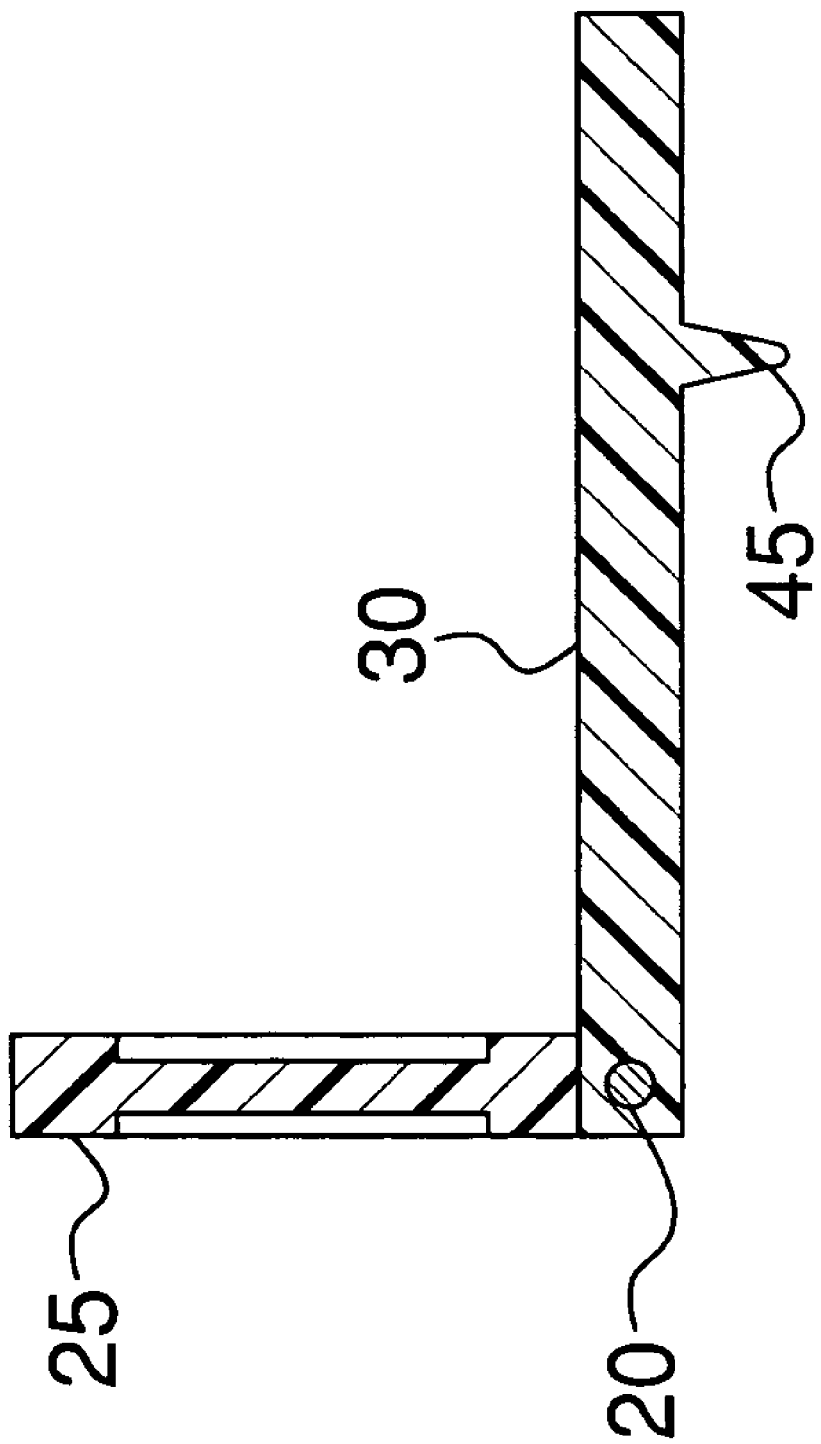
FIG. 6 is cross sectional view of the alternative embodiment.

At times the bottom surface 30 may shift and the placement of a preformed or molded ridge 45, which is inserted into the gap, which is formed between the truck bed and device tailgate 25, would provide added stability to this device 5. FIG. 6 A gap when the truck tailgate is folded down is unavoidable and the ridge 45 would provide additional security and stability for the device to prevent shifting in a horizontal fashion during normal operation.

Regardless of the embodiment and because of the wear and tear in a typical pick up truck all parts of the device should be constructed from durable yet weather resistant and environmentally resistant material.

The invention claimed is:

1. A device to extend a pickup truck bed, which is comprised of:
   a. a bottom surfaces;
   b. a device tailgate;
   c. a holding strap;
   d. a tailgate strap;
   e. means for connecting the holding strap;
   f. means for connecting the tailgate strap;
   g. a hinge;
   h. a ridge;
   wherein the bottom surface has a first end and a second end;
   wherein the device tailgate is positioned on the second end of the device;
   wherein the device tailgate is secured to the bottom surface at the second end by the hinge;
   wherein the bottom surface of the device rests on the truck tailgate and a portion of the pickup truck bed;
   wherein the holding strap has a first end and a second end;
   wherein the first end of the holding strap is attached to a top surface of the device tailgate;
   wherein means for connecting to the pickup truck is on the second end of the holding strap;
   wherein the holding straps secure the top surface of the device tailgate to the pickup truck;
   wherein the tailgate strap secures the bottom surface to the tailgate of the pickup truck;
   wherein the ridge is inserted into a gap, which is formed between the tailgate of the truck and truck bed.

2. The device as described in claim 1 wherein the means for connecting the holding strap is a hook of predetermined size and configuration, which fits within a hole on the side of the pickup truck.

3. The device as described in claim 1 wherein the means for connecting the holding strap is a pin, which is attached to the side of the pickup truck.

4. The device as described in claim 1 wherein the means for connecting the tailgate strap is a plurality of hooks on an outside edge of the bottom surface of the tailgate.

5. The device as described in claim 1 wherein the tailgate is of solid construction.

* * * * *